UNITED STATES PATENT OFFICE.

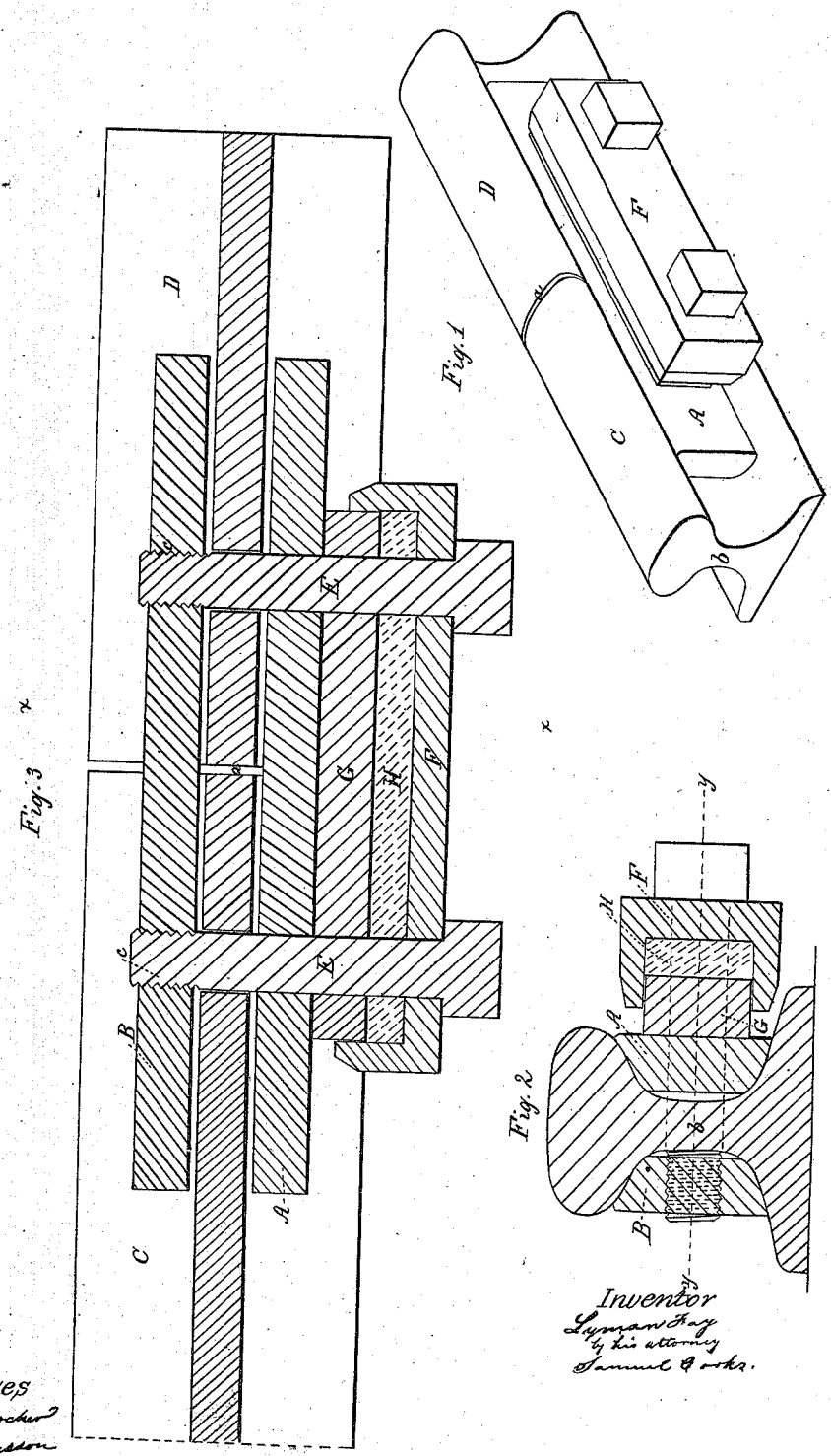

LYMAN FAY, OF FALL RIVER, MASSACHUSETTS.

IMPROVEMENT IN MODES OF SECURING RAILROAD-JOINTS.

Specification forming part of Letters Patent No. 35,597, dated June 17, 1862.

*To all whom it may concern:*

Be it known that I, LYMAN FAY, of Fall River, in the county of Bistol and State of Massachusetts, have invented certain Improvements in Securing the Joints of Railroad-Rails and the Fish-Pieces which are applied thereto, of which the following is a full, clear, and exact description, reference being had to the accompanying drawings, making part of this specification, in which—

Figure 1 is a view of a rail-joint with my improvements applied thereto; Fig. 2, a transverse vertical section on the line $x\ x$ of Fig. 3, and Fig. 3 a horizontal section on the line $y\ y$ of Fig. 2.

To secure the joint of railroad-rails, and to keep them in line and level, fish-pieces A B of these drawings are applied, one on each side of the rails, overlapping the joint. These pieces are formed to fit in the hollow against the thin part or neck of the rails, where they are secured by bolts passing through them and through the rails, the bolts being drawn up tight by nuts to bind the fish-pieces firmly against the rails. It is found in practice to be difficult to keep these several parts in position, as the jar of the passing trains loosens the nuts and bolts, when the fish-pieces rattle and wear, and cease to hold the joint firm, as they are intended to do.

My present invention consists in a method, to be hereinafter described, of securing these fish-pieces and the joint of the rails.

That others skilled in the art may understand and use my invention, I will proceed to describe the manner in which I have carried it out.

In the said drawings, C and D are the two rails, the joint $a$ of which is overlapped by two fish-pieces, A B, of iron, which are formed to lie in the hollow of the rails on each side of the neck $b$. Screw-bolts E pass through the fish-pieces and through the neck of the rails, a screw, $c$, on each bolt screwing into one of the fish-pieces. To keep these bolts from turning back and loosening, and also to keep the fish-pieces in contact with the rails, and prevent their rattling and wearing, I adopt the following device:

A cast-iron box, F, has an iron block or follower, G, that fits within the sides of the box and rests on an elastic packing, H, contained in the box. (I have tried wood, but prefer vulcanized india-rubber for this packing.) The bolts E pass through this box, packing, and follower before they enter the fish-piece A. As the bolts are screwed up tight, the packing H is severely compressed (I think, in some cases where I have tried it, with a pressure of several tons.) This binds the elastic packing so tightly around the bolts that they are not liable to unscrew, while the fish-pieces are pressed by the elasticity of the packing constantly against the rails, and the jar given to the rails by passing trains does not work the bolts loose or jar the fish-pieces off from the rails so that they wear and become loosened. By screwing the bolts E into one of the fish-pieces, I find they are less liable to loosen than when they pass through the fish-piece and have nuts screwed on their ends. I find in practice that when the fish-pieces A and B are kept up to the rails, and do not rattle and wear, the bolts or their nuts have less tendency to turn and work loose.

What I claim as my invention, and desire to secure by Letters Patent, is—

The method, substantially as above described, of securing the fish-pieces A B, which overlap and confine the joint $a$ of two railroad-rails—viz., the box F and follower G with the elastic packing H and the bolts E passing through them.

LYMAN FAY.

Witnesses:
THOS. R. ROACH,
P. E. TESCHEMACHER.